United States Patent
Shenoy et al.

(10) Patent No.: US 11,479,882 B2
(45) Date of Patent: *Oct. 25, 2022

(54) FIBERS MADE FROM SOLUBLE POLYMERS

(71) Applicant: DONALDSON COMPANY, INC., Minneapolis, MN (US)

(72) Inventors: Suresh L. Shenoy, Bloomington, MN (US); Thomas M. Weik, Deephaven, MN (US)

(73) Assignee: Donaldson Company, Inc., Bloomington, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 16/851,746

(22) Filed: Apr. 17, 2020

(65) Prior Publication Data
US 2020/0240046 A1 Jul. 30, 2020

Related U.S. Application Data

(63) Continuation of application No. 15/219,455, filed on Jul. 26, 2016, now Pat. No. 10,640,891, which is a
(Continued)

(51) Int. Cl.
*D01F 8/16* (2006.01)
*D01F 6/94* (2006.01)
(Continued)

(52) U.S. Cl.
CPC ........... *D01F 8/16* (2013.01); *B01D 39/1623* (2013.01); *C08L 37/00* (2013.01); *C08L 39/08* (2013.01);
(Continued)

(58) Field of Classification Search
CPC ...... C08L 37/00; C08L 61/28; C08L 2201/54; C08L 2203/12; C08L 2205/04;
(Continued)

(56) References Cited

U.S. PATENT DOCUMENTS 2,265,742 A    12/1941    Norton, Jr. et al.
2,338,570 A     1/1944    Childs
(Continued)

FOREIGN PATENT DOCUMENTS

CN    101934172       6/2016
EP    1 294 561 B1    4/2005
(Continued)

OTHER PUBLICATIONS

Miethe et al., "Electronic transport in CdSe nanoplatelet based polymer fibres", 2018, J. Mater. Chem. C, 6:10916-10923.
(Continued)

*Primary Examiner* — Dirk R Bass
(74) *Attorney, Agent, or Firm* — Mueting Raasch Group

(57) ABSTRACT

A fiber can be made having a structure with an axial core and a coating layer. The fiber can have a polymer core and one or two layers surrounding the core. The fine fiber can be made from a polymer material and a resinous aldehyde composition such that the general structure of the fiber has a polymer core surrounded by at least a layer of the resinous aldehyde composition.

18 Claims, 5 Drawing Sheets

Figure 1:
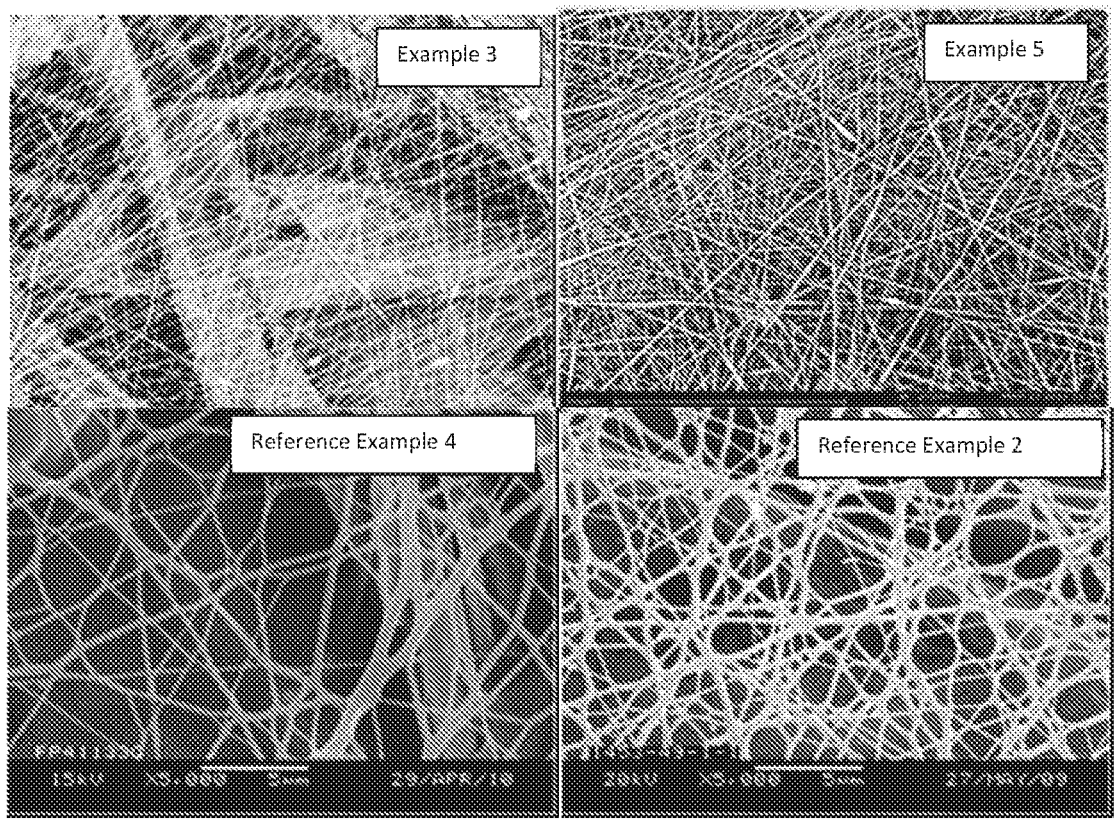

Related U.S. Application Data continuation of application No. 14/346,497, filed as application No. PCT/US2012/056545 on Sep. 21, 2012, now Pat. No. 9,435,056.

(60) Provisional application No. 61/537,171, filed on Sep. 21, 2011.

(51) Int. Cl.

| | | |
|---|---|---|
| *D04H 1/728* | (2012.01) | |
| *C09D 161/06* | (2006.01) | |
| *C09D 161/26* | (2006.01) | |
| *C09D 161/28* | (2006.01) | |
| *C08L 37/00* | (2006.01) | |
| *D01D 5/00* | (2006.01) | |
| *D01F 6/20* | (2006.01) | |
| *D01F 6/56* | (2006.01) | |
| *D01F 8/04* | (2006.01) | |
| *B01D 39/16* | (2006.01) | |
| *D01F 6/42* | (2006.01) | |
| *C08L 39/08* | (2006.01) | |
| *C08L 61/06* | (2006.01) | |
| *C08L 61/26* | (2006.01) | |
| *C08L 61/28* | (2006.01) | |

(52) U.S. Cl.
CPC ......... *C09D 161/06* (2013.01); *C09D 161/26* (2013.01); *C09D 161/28* (2013.01); *D01D 5/0007* (2013.01); *D01F 6/20* (2013.01); *D01F 6/42* (2013.01); *D01F 6/56* (2013.01); *D01F 6/94* (2013.01); *D01F 8/04* (2013.01); *D04H 1/728* (2013.01); *C08L 61/06* (2013.01); *C08L 61/26* (2013.01); *C08L 61/28* (2013.01); *C08L 2201/54* (2013.01); *C08L 2203/12* (2013.01); *C08L 2205/04* (2013.01); *C08L 2312/00* (2013.01); *D10B 2321/12* (2013.01); *D10B 2505/04* (2013.01); *Y10T 428/298* (2015.01); *Y10T 428/2967* (2015.01)

(58) Field of Classification Search
CPC ...... C08L 2312/00; C08L 39/08; C08L 61/06; C08L 61/26; B01D 39/1623; C09D 161/06; C09D 161/26; C09D 161/28; D01D 5/0007; D01F 6/20; D01F 6/42; D01F 6/56; D01F 6/94; D01F 8/04; D01F 8/16; D04H 1/728; D10B 2321/12; D10B 2505/04; Y10T 428/2967; Y10T 428/298
See application file for complete search history.

(56) References Cited

U.S. PATENT DOCUMENTS

| | | |
|---|---|---|
| 3,998,690 A | 12/1976 | Lyness et al. |
| 4,088,620 A | 5/1978 | Nihongi et al. |
| 4,113,912 A | 9/1978 | Okita |
| 4,603,083 A | 7/1986 | Tanaka et al. |
| 4,650,506 A | 3/1987 | Barris et al. |
| 4,698,194 A | 10/1987 | Tanaka et al. |
| 4,992,515 A | 2/1991 | Ballard |
| 5,143,954 A | 9/1992 | Hutton et al. |
| 5,364,456 A | 11/1994 | Kahlbaugh et al. |
| 5,591,239 A * | 1/1997 | Larson .................... A47L 13/16 51/294 |
| 5,604,007 A | 2/1997 | Shore |
| 5,672,399 A | 9/1997 | Kahlbaugh et al. |
| 5,919,716 A | 7/1999 | Raynolds et al. |
| 6,165,572 A | 12/2000 | Kahlbaugh et al. |
| 6,174,601 B1 | 1/2001 | Stanitis et al. |
| 6,268,440 B1 | 7/2001 | Kudo et al. |
| 6,368,386 B1 | 4/2002 | Nelson et al. |
| 6,641,773 B2 | 11/2003 | Kleinmeyer et al. |
| 6,673,136 B2 | 1/2004 | Gillingham et al. |
| 6,716,274 B2 | 4/2004 | Gogins et al. |
| 6,740,142 B2 | 5/2004 | Buettner et al. |
| 6,743,273 B2 | 6/2004 | Chung et al. |
| 6,746,517 B2 | 6/2004 | Benson et al. |
| 6,800,117 B2 | 10/2004 | Barris et al. |
| 6,855,743 B1 | 2/2005 | Gvozdic |
| 6,875,256 B2 | 4/2005 | Gillingham et al. |
| 6,924,028 B2 | 8/2005 | Chung et al. |
| 6,955,775 B2 | 10/2005 | Chung et al. |
| 6,994,742 B2 | 2/2006 | Barris et al. |
| 7,008,465 B2 | 3/2006 | Graham et al. |
| 7,070,640 B2 | 7/2006 | Chung et al. |
| 7,090,715 B2 | 8/2006 | Chung et al. |
| 7,093,664 B2 | 8/2006 | Todd et al. |
| 7,115,150 B2 | 10/2006 | Johnson et al. |
| 7,179,317 B2 | 2/2007 | Chung et al. |
| 7,270,693 B2 | 9/2007 | Chung et al. |
| 7,316,723 B2 | 1/2008 | Chung et al. |
| 7,318,852 B2 | 1/2008 | Chung et al. |
| 7,318,853 B2 | 1/2008 | Chung et al. |
| 7,615,567 B2 | 11/2009 | Carroll |
| 7,641,055 B2 | 1/2010 | Ferrer et al. |
| 7,927,540 B2 | 4/2011 | Smithies et al. |
| 7,988,860 B2 | 8/2011 | Kalayci et al. |
| 8,029,588 B2 | 10/2011 | Chung et al. |
| 8,118,901 B2 | 2/2012 | Chung et al. |
| 8,366,797 B2 | 2/2013 | Chung et al. |
| 8,403,151 B2 | 3/2013 | Cheng et al. |
| 8,512,431 B2 | 8/2013 | Chung et al. |
| 9,435,056 B2 | 9/2016 | Shenoy et al. |
| 2001/0049421 A1 | 12/2001 | Burlone et al. |
| 2002/0176986 A1 | 11/2002 | Watanabe et al. |
| 2002/0198355 A1 | 12/2002 | Wonner et al. |
| 2003/0106294 A1 | 6/2003 | Chung et al. |
| 2004/0060268 A1 | 4/2004 | Chung et al. |
| 2004/0087706 A1 | 5/2004 | Fish et al. |
| 2004/0096656 A1 | 5/2004 | Bond |
| 2004/0166751 A1 | 8/2004 | Peng et al. |
| 2005/0070186 A1 | 3/2005 | Shoemake et al. |
| 2005/0235619 A1 | 10/2005 | Heinz et al. |
| 2006/0098342 A1 | 5/2006 | Matsumoto et al. |
| 2006/0231487 A1 | 10/2006 | Bartley et al. |
| 2007/0082393 A1 | 4/2007 | Lodhi et al. |
| 2008/0110822 A1 | 5/2008 | Chung et al. |
| 2008/0157036 A1 | 7/2008 | Ogawa et al. |
| 2008/0307971 A1 | 12/2008 | Horie et al. |
| 2009/0032475 A1 | 2/2009 | Ferrer et al. |
| 2009/0065436 A1 | 3/2009 | Kalayci et al. |
| 2009/0110843 A1 | 4/2009 | Halahmi et al. |
| 2010/0064645 A1 | 3/2010 | Chung et al. |
| 2010/0178507 A1 | 7/2010 | Ferrer et al. |
| 2010/0269995 A1 | 10/2010 | Gupta et al. |
| 2011/0042316 A1 | 2/2011 | Chen et al. |
| 2011/0047719 A1 | 3/2011 | Yeh et al. |
| 2011/0067369 A1 | 3/2011 | Chung et al. |
| 2011/0230586 A1 | 9/2011 | Schwalm et al. |
| 2013/0068687 A1 | 3/2013 | Shenoy et al. |
| 2013/0199992 A1 | 8/2013 | Chung et al. |
| 2013/0251992 A1 | 9/2013 | Kono et al. |
| 2014/0196420 A1 | 7/2014 | Chung et al. |
| 2014/0230390 A1 | 8/2014 | Shenoy et al. |

FOREIGN PATENT DOCUMENTS

| | | |
|---|---|---|
| EP | 2 287 372 A1 | 2/2011 |
| GB | 1 376 756 A | 12/1974 |
| GB | 1 424 698 A | 2/1976 |
| JP | 2003-336127 A | 11/2003 |
| KR | 10-2005-0024298 | 3/2005 |
| WO | 1999/036620 A1 | 7/1999 |
| WO | 2002/20668 A2 | 3/2002 |
| WO | 2002/034848 A2 | 5/2002 |
| WO | 2006/052732 | 5/2006 |
| WO | 2008/143100 A1 | 11/2008 |
| WO | 2009/064767 A2 | 5/2009 |

(56) References Cited

FOREIGN PATENT DOCUMENTS

WO    2009/152439 A1    12/2009
WO    2012/073737 A1    6/2012

OTHER PUBLICATIONS

Piras et al., "New Multicomponent Bioerodible Electrospun Nanofibers for Dual-controlled Drug Release", Sep. 2008, Journal of Bioactive and Compatible Polymers, 23:423-443. Available online at http://jbc.sagepub.com.

Rzayev et al., "Functional Copolymer/Organo-MMT Nanoarchitectures: XXVI. Fabrication and Characterization of Electrospun Nanofibers from PCL/ODA-MMT and Copolymer-g-PLA/Ag-MMT Blends", 2015, Polymer-Plastics Technology and Engineering, 54:1723-1734.

"CYMEL® Amino Resin Crosslinkers for the Coating Industry," Product and Application Guide [online]. Cytec Industries, Inc., Woodland Park, NJ, 2008 [retrieved on Feb. 1, 2013]. Retrieved from the Internet:URL: http://www.cytec.com/liquids/Downloads/CYMEL_AminoResinCrosslinkers.pdf; 42pgs.

International Search Report and Written Opinion for PCT/US2012/056511, issued by the European Patent Office, dated Dec. 12, 2012: 9 pgs.

International Search Report and Written Opinion for PCT/US2012/056545, issued by the United States Patent Office, dated Jan. 18, 2013: 14 pgs.

Partial Supplemental European Search Report for EP Application No. 12833177.4 dated Mar. 5, 2015; 5 pgs.

\* cited by examiner fiber 100 fiber 102

FIBERS MADE FROM SOLUBLE POLYMERS

CROSS-REFERENCE TO RELATED APPLICATIONS

The present application is a continuation of U.S. patent application Ser. No. 15/219,455, filed on Jul. 26, 2016, which is a continuation of U.S. patent application Ser. No. 14/346,497, filed on Mar. 21, 2014 and issued as U.S. Pat. No. 9,435,056 on Sep. 6, 2016, which is the § 371 U.S. National Stage of International Application No. PCT/US2012/056545, filed Sep. 21, 2012, which claims priority to U.S. Provisional Application Ser. No. 61/537,171, filed on Sep. 21, 2011, each of which is incorporated herein by reference in its entirety.

BACKGROUND OF THE DISCLOSURE

Recent technologies have been used to form layers of fine fiber. Fine fiber technologies that contemplate polymeric materials mixed or blended with a variety of other substances are disclosed in, for example Chung et al., U.S. Pat. No. 6,743,273. These fibers have found commercial acceptance in certain filtration applications in which a layer of fine fiber is formed on a filtration substrate. Certain of the disclosed fibers comprise an axial core comprising a phase comprising polymer materials. Surrounding the axial core can be found a layer of a coating material such as a phenolic oligomer or a fluoropolymer component.

In the formation of these fibers, a solution of the polymer and additive is formed by melt processes or electrospun to form the fiber. In certain fiber-making processes, solvents that are safe and easy to use are desired in industrial applications. Fibers formed using such solvents often need to survive and perform well in a wide variety of environments.

SUMMARY

A unique fiber material is formed by mixing or blending a polymer material with a resinous aldehyde composition. The resinous aldehyde composition is one that can self-crosslink and the polymer is one that is nonreactive with the resinous aldehyde composition.

In certain embodiments, when formed into a fiber, the mixture or blend of nonreactive polymer material and resinous aldehyde composition forms a uniform (i.e., homogeneous) mixture (i.e., blend) of the two components in a semi-interpenetrating network morphology.

In certain embodiments, when formed into a fiber, the mixture or blend of nonreactive polymer material and resinous aldehyde composition, at appropriate ratios, preferably forms at least two (e.g., concentric or coaxial) phases. The first phase is an internal core or axial polymer phase that includes the polymer material as the predominant material. Herein, "internal core," "core phase," "first phase," and "axial phase" are used interchangeably. The first core phase is surrounded by a second (coating) phase that includes the resinous aldehyde composition as the predominant material.

Thus, the present disclosure provides a fiber (preferably, a fine fiber) comprising a core phase and a coating phase, wherein the core phase comprises a polymer and the coating phase comprises a resinous aldehyde composition.

With the use of appropriate ratios of polymer material and resinous aldehyde composition in the fiber formation, in some embodiments, the fiber comprises three phases. In this embodiment, an internal axial polymer phase includes the polymer material as the predominant material or major amount, with negligible self-crosslinked resinous aldehyde composition (if present, it is only present in a minor phase). Surrounding the internal axial polymer phase is a second phase (i.e., a transition layer or transition phase) comprising a mixture of the polymer material and a self-crosslinked resinous aldehyde (typically, there are equivalent amounts of polymer and resinous aldehyde present in this transition phase). The fiber additionally contains a third exterior phase (i.e., the outermost coating) comprising resinous aldehyde as the predominant or major component.

Thus, the present disclosure also provides a fiber (e.g., a nanofiber or microfiber, and preferably a fine fiber as described herein) comprising a core phase and a coaxial coating phase; wherein the core phase comprises a nonreactive polymer and the coating phase comprises a resinous melamine-aldehyde composition; wherein a negligible portion of the nonreactive polymer is crosslinked by the resinous melamine-aldehyde composition; and further wherein the fine fiber is prepared from a resinous melamine-aldehyde composition in an amount of greater than 20 parts by weight per 100 parts by weight of the nonreactive polymer.

Herein, a fiber has an average fiber diameter of typically no greater than 100 microns. Typically, this means that a sample of a plurality of fibers of the present disclosure has an average fiber diameter of no greater than 100 microns. A preferred "fine" fiber has an average fiber diameter of no greater than 10 microns.

The fiber of the present disclosure is preferably prepared from a resinous aldehyde composition comprising alkoxy groups and other groups capable of self-crosslinking (e.g., by condensation) and a nonreactive polymer, wherein the weight ratio of resinous aldehyde composition to polymer is preferably greater than 20:100.

In these embodiments, a layer of fine fibers can be manufactured by forming a plurality of fine fibers on a filtration substrate, thereby forming a filter media. The filter media (i.e., fine fiber layer plus filtration substrate) can then be manufactured into filter elements (i.e., filtration elements), including, e.g., flat-panel filters, cartridge filters, or other filtration components.

The terms "comprises" and variations thereof do not have a limiting meaning where these terms appear in the description and claims.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one."

The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise. The term "and/or" means one or all of the listed elements or a combination of any two or more of the listed elements.

Also herein, all numbers are assumed to be modified by the term " " and preferably by the term "exactly." As used herein in connection with a measured quantity, the term " " refers to that variation in the measured quantity as would be expected by the skilled artisan making the measurement and exercising a level of care commensurate with the objective of the measurement and the precision of the measuring equipment used.

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DRAWINGS

The disclosure may be more completely understood in connection with the following drawings, in which FIGS. 1 through 5 comprise test data and results that demonstrate the structure and nature of fine fiber materials made from a mixture or blend of polymer material and resinous aldehyde composition.

FIG. 1: Comparison of fiber morphology for Reference Examples 2 and 4, Example 5 (control), and Example 3.

Figure 2:
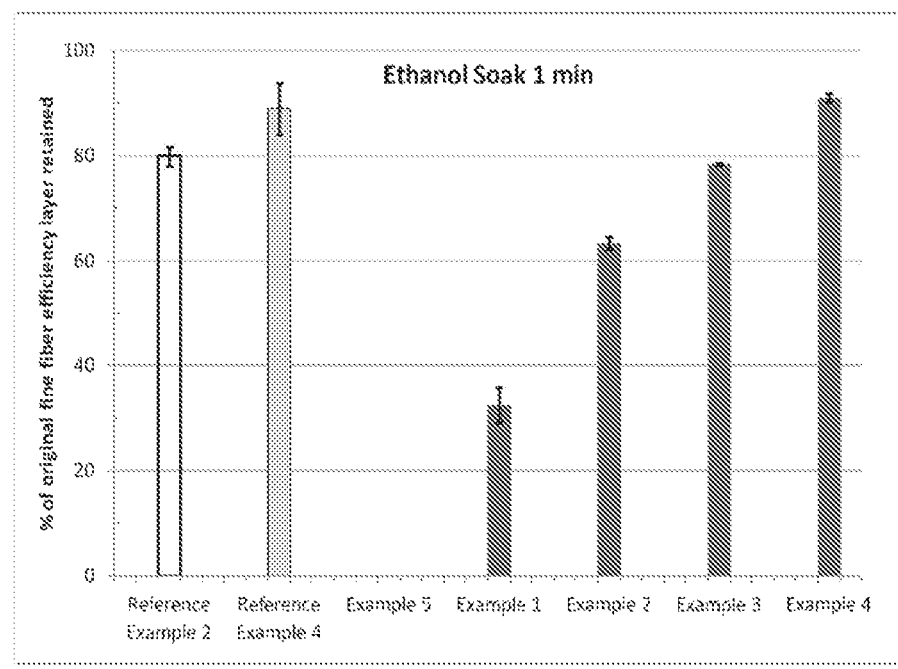
Figure 2:
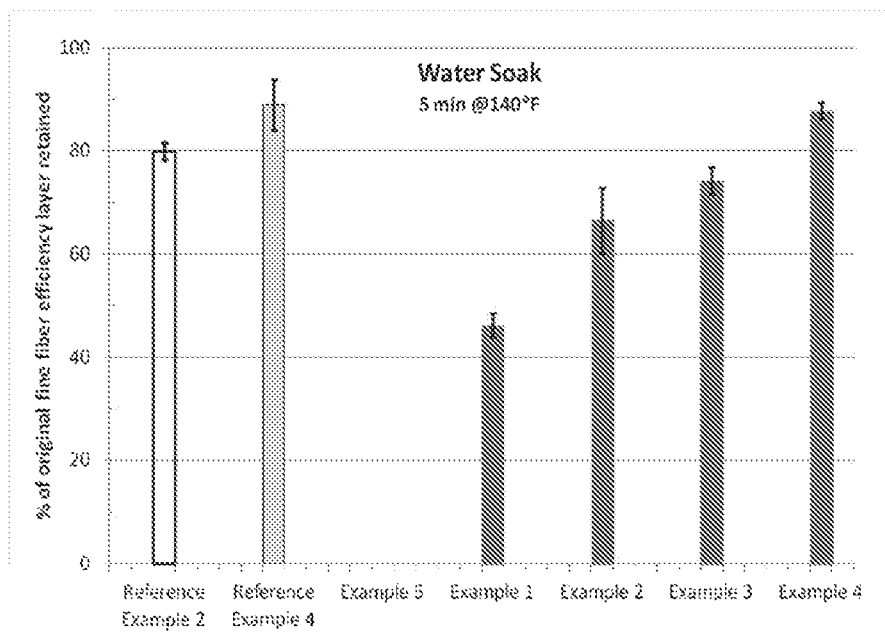

FIG. 2: (a) Ethanol soak test for 1 min; (b) Water soak test at 140° F. for 5 min.

Figure 3:
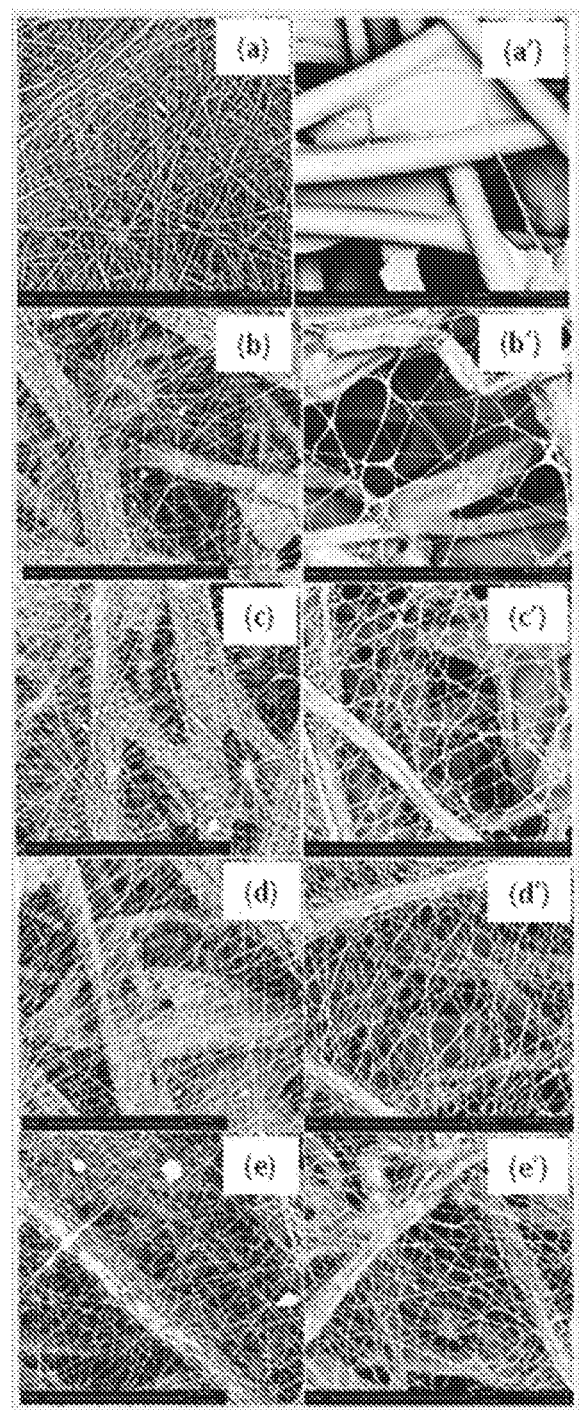

FIG. 3: SEM images of filter media after ethanol soak test for 1 min. Images denoted by a, b, d, e correspond to "as is" samples for nanofiber compositions. Images denoted by a', b', c', d', e' correspond to "post ethanol soak" samples.

Figure 4:
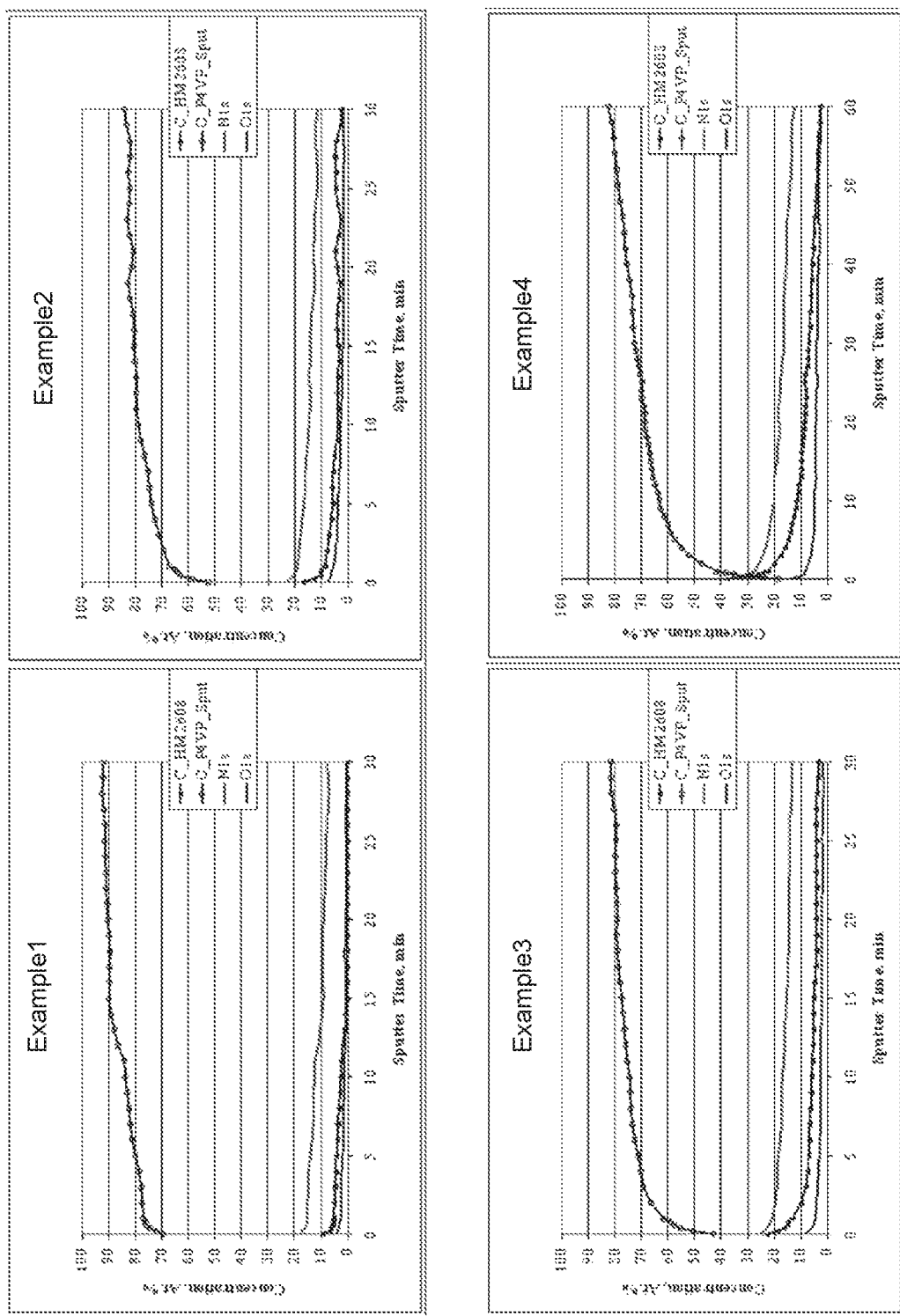

FIG. 4: Profile plots of atomic (C1s (C_P4VP and HM 2608), N1s and O1s) species obtained for P4VP/melamine resin by C60 ion gun sputtering.

Figure 5:
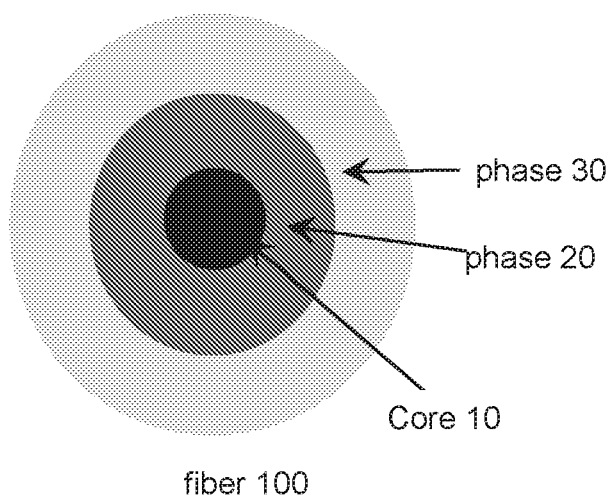
Figure 5:
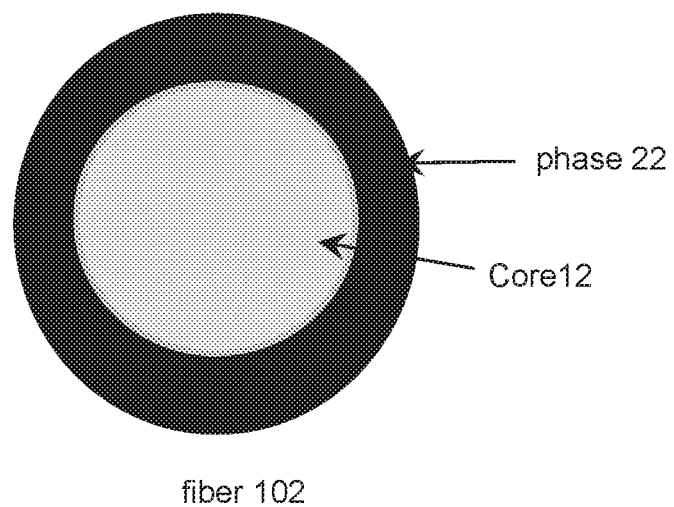

FIG. 5: Pictorial representation of the fiber cross-section based on ESCA/C60 results for P4VP:ME sat weight ratios of (a) 1:0.2, 1:0.4 and 1:0.6, and (b) 1:0.8 respectively.

DETAILED DESCRIPTION OF ILLUSTRATIVE EMBODIMENTS

Polymer webs have been made by electrospinning, melt spinning, extrusion melt spinning, air laid processing or wet laid processing. The filtration efficiency of such filters is characteristic of the filtration media and is related to the fraction of the particulate removed from the mobile fluid stream. Efficiency is typically measured by a set test protocol, an example of which is defined in the patents listed below. Fine fiber technologies that contemplate polymeric materials mixed or blended with a variety of other substances is disclosed in Chung et al., U.S. Pat. No. 6,743,273; Chung et al., U.S. Pat. No. 6,924,028; Chung et al., U.S. Pat. No. 6,955,775; Chung et al., U.S. Pat. No. 7,070,640; Chung et al., U.S. Pat. No. 7,090,715; Chung et al., U.S. Patent Publication No. 2003/0106294; Barris et al., U.S. Pat. No. 6,800,117; and Gillingham et al., U.S. Pat. No. 6,673,136. Additionally, in Ferrer et al., U.S. Pat. No. 7,641,055, a water-insoluble, high-strength polymer material is made by mixing or blending a polysulfone polymer with a polyvinyl pyrrolidone polymer resulting in a single phase polymer alloy used in electrospinning fine fiber materials. While the fine fiber materials discussed above have adequate performance for a number of filtration end uses, in applications with extremes of temperature ranges, where mechanical stability is required, improvements in fiber properties can always be made.

The fibers of the present disclosure are made by combining a fiber-forming polymer material and a resinous aldehyde composition that includes reactive groups for self-crosslinking, such as a reactive melamine-formaldehyde resin. In this context, "reactive" means that the resin includes one or more functional groups capable of self-crosslinking but not reacting with one or more polymers used in making the fine fibers. Herein, "resin" or "resinous" refers to monomers, oligomers, and/or polymers, particularly of a nature that can migrate to the surface of a fine fiber. Herein, the term "resinous aldehyde composition" refers to the starting material as well as the material in the final fibers. It will be understood that in the final fibers, at least portions of the resinous aldehyde composition will be involved in self-crosslinking.

These components can be combined in solution or melt form. In certain embodiments, the fine fibers are electrospun from a solution or dispersion. Thus, the polymer materials and resinous aldehyde (e.g., melamine-aldehyde) compositions are dispersible or soluble in at least one common solvent or solvent blend suitable for electrospinning.

Referring to FIG. 5, as the fiber 100/102 forms, the resinous aldehyde composition preferably forms at least one exterior concentric layer (i.e., phase), such as a second coating phase 22 (fiber 102) comprising predominantly the resinous aldehyde composition (e.g., melamine-aldehyde composition), or two exterior concentric layers (i.e., phases) such as a second coating phase 20 (fiber 100) comprising a mixture of the polymer material and a resinous aldehyde composition, and a third exterior phase (outermost phase) 30 (fiber 100) comprising predominantly the resinous aldehyde composition. That is, the resinous aldehyde composition can migrate to the surface to form a two-phase fiber (fiber 102) or a three-phase fiber (fiber 100), in which the core 10 (fiber 100) or 12 (fiber 102) comprises primarily the polymer material (e.g., poly(4-vinyl pyridine) also referred to as P4VP).

In this context, "predominantly" means the referenced material is present in a particular region (e.g., coating, layer, or phase) in a major amount (i.e., greater than 50% by weight) of the material in that region.

Preferably, the fine fiber of the present disclosure is prepared from a self-crosslinkable resinous aldehyde composition comprising reactive groups (preferably, alkoxy groups) and a polymer comprising no, or a low amount of, reactive groups (i.e., groups capable of reacting with the reactive groups of the resinous aldehyde composition), wherein the weight ratio of self-crosslinkable resinous aldehyde to nonreactive polymer is at least (preferably, greater than) 20:100 (i.e., 20 parts resinous aldehyde composition to 100 parts nonreactive polymer). More preferably, the weight ratio of the self-crosslinkable resinous aldehyde composition to nonreactive polymer is greater than 40:100. Even more preferably, the weight ratio of the self-crosslinkable resinous aldehyde composition to the nonreactive polymer is greater than 60:100.

Preferably, the weight ratio of the self-crosslinkable resinous aldehyde composition to nonreactive polymer is no greater than 300:100. More preferably, the weight ratio of the self-crosslinkable resinous aldehyde composition to the nonreactive polymer is no greater about 250:100. Even more preferably, the weight ratio of the self-crosslinkable resinous aldehyde composition to nonreactive polymer is no greater than 210:100.

In certain embodiments, using a weight ratio of resinous aldehyde composition to polymer of greater than 40:100, results in a polymer/semi-interpenetrating network type structure wherein the interpenetrating network is the self-crosslinked resinous aldehyde. This provides improved properties, such as humidity resistance, to the fine fibers and fine fiber layers of the invention, relative to commercially available fibers and fiber layers.

Suitable resinous aldehyde compositions include one or more reactive groups that are capable of self-crosslinking in a fiber-making process as described herein. Such reactive groups include alkoxy groups as well as hydroxyl, carboxylic acid, and/or —NH groups. Exemplary resinous aldehyde compositions are synthetic resins made by treating various aldehydes with a reactant under condensation reaction conditions. Useful such reactants include phenol, urea, aniline, benzoguanamine, glycoluril, and melamine. Useful resinous aldehyde compositions include aldehyde-based agents that can be used in self-crosslinking reactions. The resinous aldehyde compositions are typically nonvolatile. The resinous aldehyde compositions should also be soluble in a solvent chosen for the polymer material for processing, such as in electrospinning. Resinous aldehyde compositions useful as crosslinking agents include, a condensation product of urea and an aldehyde, a condensation product of phenol and an aldehyde, or a condensation product of melamine and an aldehyde. One useful class of crosslinking resins includes resins based on nitrogen compounds such as melamine, urea, benzoguanamine, glycoluril, and other similar resins manufactured by reacting an aldehyde with a nitrogen compound. Such self-crosslinking resins are soluble in process solvents and possess reactivity with a variety of polymer species.

Useful resinous aldehyde compositions (e.g., melamine-aldehyde compositions) include crosslinking agents, and optionally other nonreactive room-temperature-stable resin components, that can be combined in solution or melt form with a variety of polymer materials. Melamine forms resinous compositions with a variety of other co-reactants.

Useful melamine-aldehyde compositions include melamine-aldehyde products generally formed by the reaction between melamine and an aldehyde compound. Useful aldehyde compounds include $C_{1-6}$ alkanals including formaldehyde, acetaldehyde, butyraldehyde, isobutyraldehyde, and the like. Mixtures of such aldehydes can be used if desired. The melamine-aldehyde resins, and other suitable resinous aldehyde compositions, include components having at least two alkoxy groups per molecule. Typical partially and fully reacted melamine-aldehydes have from 3 to 6, or from 4 to 6, alkoxy groups per molecule.

In certain embodiments, the resinous aldehyde composition comprises a condensation product of urea and an aldehyde, a condensation product of phenol and an aldehyde, a condensation product of melamine and an aldehyde, or a mixture thereof. In certain embodiments, the resinous aldehyde composition comprises a condensation product of benzoguanamine and an aldehyde, a condensation product of glycouril and an aldehyde, or a mixture thereof.

Useful resinous aldehyde compositions (e.g., melamine-aldehyde compositions) include compounds and mixtures thereof including: partially methylated melamine; methylated high imino melamine; high imino mixed ether melamine; n-butylated high imino and partially n-butylated melamine; partially iso-butylated melamine; partially n-butylated urea; partially iso-butylated urea; glycoluril; methoxyethyl methylol melamine resins; among others that self-crosslink.

Various melamine compositions that self-crosslink are sold under the trade names CYMEL available from Cytec Industries of West Paterson, N.J., wherein such compositions include, for example, CYMEL 3745, CYMEL MM-100, CYMEL 3749, CYMEL 323, CYMEL 325, CYMEL 327, CYMEL 328, CYMEL 370, CYMEL 373, CYMEL 385, CYMEL 1158, CYMEL 1172, CYMEL UM-15, CYMEL U-64, CYMEL U-65, CYMEL U-21-571, CYMEL U-93-210, CYMEL U-216-10-LF, CYMEL U-227-8, CYMEL U-1050-10, CYMEL U-1052-8, CYMEL U-1054, CYMEL UB-25-BE, CYMEL UB-30-B, CYMEL U-662, CYMEL U-663, CYMEL U-1051, CYMEL UI-19-1, CYMEL UI-21E, CYMEL UI-27-EI, CYMEL UI-38-I, and the like; and various melamine compositions sold under the trade name LUWIPAL and available from the BASF AG of Ludwigshafen, Germany, wherein such compositions include, for example, LUWIPAL LR 8955, LUWIPAL LR 8968, and LUWIPAL LR 8984. Such resins are also available from INEOS Melamines Inc. sold under the trade names RESIMENE (e.g., RESIMENE HM2608), MAPRENAL, and MADURIT. The primary condition for such material is the ability of it to self-condense (i.e., self-crosslink). Various combinations of resinous aldehyde compositions can be used if desired; however, such combinations will include at least one self-crosslinking aldehyde component.

In many preferred embodiments, a melamine-formaldehyde resin (sometimes referred to herein as simply a "melamine" composition or "melamine" resin) is used. Reference to melamine-formaldehyde resins means a melamine-based rein that has two or more (at least two) alkoxy functional groups (methoxy, ethoxy, propoxy, butoxy, etc.) per melamine molecule. Besides the alkoxy functional groups, the melamine-formaldehyde resins include imine (—NH—), carboxylic acid (—C(O)OH), or hydroxyl (—OH) functional groups, or combinations thereof, to impart the ability to self-crosslink. Depending on the functional groups in the melamine formaldehyde resins, uncrosslinked resins can be both water soluble and water insoluble, or soluble in organic solvents such as alcohols, hydrocarbons (toluene, xylene, etc.) or others, or a mixture of these solvents.

Melamine-formaldehyde resins are made from the reaction of formaldehyde with melamine. Melamine (chemical formula $C_3H_6N_6$) and formaldehyde (chemical formula $CH_2O$) have the following structures:

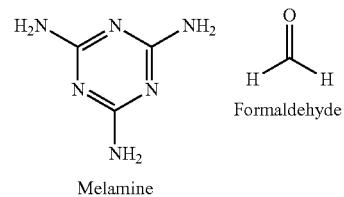

wherein melamine is 1,3,5-triazine-2,4,6-triamine; or 2,4,6-triamino-s-triazine; or cyanuro triamide. A representative structure for the melamine-formaldehyde resin is shown in structure I:

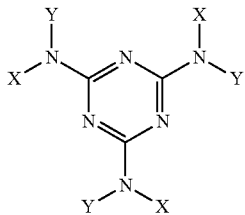

wherein in compound I, each X and each Y is independently H, —(CH$_2$)$_x$—O—R (R=H or (C1-C4)alkyl and x=1-4), or —(CH$_2$)$_y$—C(O)OH (y=1-4), and further wherein at least two of the X and Y groups are —(CH$_2$)$_x$—O—R (R=(C1-C4)alkyl and x=1-4), and at least one of the X and Y groups is H, —(CH$_2$)$_x$—OH (x=1-4), and/or —(CH$_2$)$_y$—C(O)OH (y=1-4). Preferably if the compound has two or three —(CH$_2$)$_x$—O—R (R=C1-C4 alkyl and x=1-4) groups, they are not on the same nitrogen substituent.

In the fibers of the disclosure, the self-crosslinkable resinous aldehyde composition of the disclosure is combined with a polymer material that comprises a polymer or polymer mixture or blend. The polymer or polymer mixture or blend is selected such that it can be combined with the resinous aldehyde composition in a solution or dispersion or in the melt. The combination of polymer material and resinous aldehyde composition, in certain embodiments, should be substantially stable in the melt or in solution or dispersion form for sufficient time such that the fiber can be formed.

The polymer or polymer mixture or blend should include at least one fiber-forming polymer, and should include no, or very few, reactive groups capable of being crosslinked by the resinous aldehyde composition. Exemplary polymer reactive groups that should not be present include active hydrogen groups. Active hydrogen groups include, but are not limited to thiol (—SH), hydroxyl (—OH), carboxylate (—CO$_2$H), amido (—C(O)—NH— or —C(O)—NH$_2$), amino (—NH$_2$), or imino (—NH—), and anhydride (—COO)$_2$R groups (upon hydrolysis).

Polymer materials suitable for use in the polymeric compositions of the disclosure include both addition polymer and condensation polymer materials that are nonreactive polymers. In this context, "nonreactive" is defined as being unable to crosslink with the resinous aldehyde composition used (as compared to reactive polymers (e.g., nylon) as described in application entitled FINE FIBERS MADE FROM POLYMER CROSSLINKED WITH RESINOUS ALDEHYDE COMPOSITION, U.S. patent application Ser. No. 15/678,840, filed on Aug. 16, 2017). For example, polymer materials such as many polyolefins, polyvinyl chloride and other such materials may be used, wherein such polymers have no groups that can crosslink with the resinous aldehyde composition. Other nonreactive polymers include polyacetals, polyesters, polyalkylene sulfides, polyarylene oxides, polysulfones, modified (e.g., polyether) polysulfone polymers, poly(vinylpyridine) such as poly(4-vinylpyridine), and the like. Preferred materials that fall within these generic classes include polyethylene, polypropylene, poly (vinyl chloride), poly(methylmethacrylate), (and other acrylic resins), polystyrene, and copolymers thereof (including ABA type block copolymers), poly(vinylidene fluoride), poly(vinylidene chloride), mixtures, blends, or alloys. Examples of useful block copolymers include ABA-type copolymers (e.g, styrene-EP-styrene) (wherein "EP" refers to ethylene-propylene) or AB (e.g., styrene-EP) polymers, KRATON styrene-b-butadiene and styrene-b-hydrogenated butadiene(ethylene propylene), available from Kraton Polymers U.S. LLC of Houston, Tex.; and SYMPATEX polyester-b-ethylene oxide, available from SympaTex Technologies Inc. of Hampton, N.H. Various combinations of nonreactive polymers can be used if desired.

Addition nonreactive polymers like poly(vinylidene fluoride), syndiotactic polystyrene, copolymers of vinylidene fluoride and hexafluoropropylene, polyvinyl acetate, amorphous addition polymers such as polystyrene, poly(vinyl chloride) and its various copolymers, and poly(methyl methacrylate) and its various copolymers can be solution spun with relative ease because they are soluble or dispersible in a variety of solvents and solvent blends at low pressures and temperatures. However, highly crystalline polymers like polyethylene and polypropylene typically require high temperature, high pressure solvents or solvent blends if they are to be solution spun. Therefore, solution spinning of the polyethylene and polypropylene is very difficult.

If desired, and depending on the resinous aldehyde composition, for example, the self-crosslinking reaction described herein may need a strong acid catalyst such as a sulfonic acid, such as para-toluene sulfonic acid. In certain embodiments, a catalyst such as an acid catalyst is preferably used in an amount of at least 4 wt-%, based on polymer solids, to enhance self-crosslinking speed. Typically, no more than 10 wt-% catalyst, such as an acid catalyst, is used in the self-crosslinking reaction of the present disclosure.

If desired, fine fibers formed from the self-crosslinking reaction of a resinous aldehyde in the presence of a nonreactive polymer material, as described herein, can be enhanced, e.g., with respect to speed and extent of self-crosslinking, by exposing the fine fibers to thermal treatment. Such thermal treatment typically includes a temperature of at least 80° C., at least 100° C., or at least 120° C., and typically no greater than 150° C., for typically at least 5 seconds, and typically no greater than 10 minutes.

One aspect of the disclosure is the utility of such fiber (preferably, fine fiber) materials as they are formed into a filter structure such as filter media. In such a structure, the fine fiber materials of the disclosure are formed on and adhered to a filter substrate (i.e., filtration substrate). Natural fiber and synthetic fiber substrates can be used as the filter substrate. Examples include spunbonded or melt-blown supports or fabrics, wovens and nonwovens of synthetic fibers, cellulosic materials, and glass fibers. Plastic screen-like materials both extruded and hole punched, are other examples of filter substrates, as are ultra-filtration (UF) and micro-filtration (MF) membranes of organic polymers. Examples of synthetic nonwovens include polyester nonwovens, polyolefin (e.g., polypropylene) nonwovens, or blended nonwovens thereof. Sheet-like substrates (e.g., cellulosic or synthetic nonwoven webs) are the typical form of the filter substrates. The shape and structure of the filter material, however, is typically selected by the design engineer and depends on the particular filtration application.

A filter media construction according to the present disclosure can include a layer of permeable coarse fibrous material (i.e., media or substrate) having a first surface. A first layer of fiber media (preferably, fine fiber media) is preferably disposed on the first surface of the layer of permeable coarse fibrous media.

Preferably, the layer of permeable coarse fibrous material comprises fibers having an average diameter of at least 5 microns, and more preferably at least 12 microns, and even more preferably at least 14 microns. Preferably, the coarse fibers have an average diameter of no greater than 50 microns. Thus, in an embodiment of the disclosure, the coarse fibrous material can also include fibers of the disclosure.

Also, preferably, the permeable coarse fibrous material comprises a media having a basis weight of no greater than 260 grams/meter$^2$ (g/m$^2$), and more preferably no greater than 150 g/m$^2$. Preferably, the permeable coarse fibrous material comprises a media having a basis weight of at least 0.5 g/m$^2$, and more preferably at least 8 g/m$^2$. Preferably, the first layer of permeable coarse fibrous media is at least 0.0005 inch (12 microns) thick, and more preferably at least 0.001 inch thick. Preferably, the first layer of permeable coarse fibrous media is no greater than 0.030 inch thick. Typically and preferably, the first layer of permeable coarse fibrous media is 0.001 inch to 0.030 inch (25-800 microns) thick. Preferably, the first layer of permeable coarse fibrous media has a Frazier permeability (differential pressure set at 0.5 inch of water) of at least 2 meters/minute (m/min). Preferably, the first layer of permeable coarse fibrous media has a Frazier permeability (differential pressure set at 0.5 inch of water) of no greater than 900 m/min.

In preferred arrangements, the first layer of permeable coarse fibrous material comprises a material which, if evaluated separately from a remainder of the construction by the Frazier permeability test, would exhibit a permeability of at least 1 m/min, and preferably at least 2 m/min. In preferred arrangements, the first layer of permeable coarse fibrous material comprises a material which, if evaluated separately from a remainder of the construction by the Frazier permeability test, would exhibit a permeability of no greater than 900 m/min, and typically and preferably 2-900 m/min. Herein, when reference is made to efficiency, unless otherwise specified, reference is meant to efficiency when measured according to ASTM-1215-89, with 0.78 micron ($\mu$) monodisperse polystyrene spherical particles, at 20 fpm (feet per minute, 6.1 m/min) as described herein.

Fibers (preferably, fine fibers) of the disclosure can be made using a variety of techniques including electrostatic spinning, wet spinning, dry spinning, melt spinning, extrusion spinning, direct spinning, gel spinning, etc. Although the following description refers specifically to "fine" fibers (i.e., having an average fiber diameter of no greater than 10 microns), it also applies to fibers of a larger fiber diameter.

Herein, a "fine" fiber has an average fiber diameter of no greater than 10 microns. Typically, this means that a sample of a plurality of fibers of the present disclosure has an average fiber diameter of no greater than 10 microns. Preferably, such fibers have an average diameter of no greater than 5 microns, more preferably no greater than 2 microns, even more preferably no greater than 1 micron, and even more preferably no greater than 0.5 micron. Preferably, such fibers have an average diameter of at least 0.005 micron, more preferably at least 0.01 micron, and even more preferably at least 0.05 micron.

The fine fibers are collected on a support layer during, for example, electrostatic or melt spinning formation, and are often heat treated after fiber making. Preferably, the layer of fine fiber material is disposed on a first surface of a layer of permeable coarse fibrous media (i.e., support layer) as a layer of fiber. Also, preferably the first layer of fine fiber material disposed on the first surface of the first layer of permeable coarse fibrous material has an overall thickness that is no greater than 50 microns, more preferably no greater than 30 microns, even more preferably no more than 20 microns, and most preferably no greater than 10 microns. Typically and preferably, the thickness of the fine fiber layer is within a thickness of 1-20 times (often 1-8 times, and more preferably no more than 5 times) the fine fiber average diameter used to make the layer. In certain embodiments, the fine fiber layer has a thickness of at least 0.05$\mu$.

In a fiber spinning process for making fine fibers of the disclosure, the polymer being spun is typically converted into a fluid state (e.g., by dissolution in solvent or melting). The fluid polymer is then forced through the spinneret, where the polymer cools to a rubbery state, and then a solidified state. The aldehyde composition can migrate to the surface as the fluid polymer transitions to a solid state. Wet spinning is typically used for polymers that need to be dissolved in a solvent to be spun. The spinneret is submerged in a chemical bath that causes the fiber to precipitate, and then solidify, as it emerges. The process gets its name from this "wet" bath. Acrylic, rayon, aramid, modacrylic, and spandex are produced via this process. Dry spinning is also used for polymers that are dissolved in solvent. It differs in that the solidification is achieved through evaporation of the solvent. This is usually achieved by a stream of air or inert gas. Because there is no precipitating liquid involved, the fiber does not need to be dried, and the solvent is more easily recovered. Melt spinning is used for polymers that can be melted. The polymer solidifies by cooling after being extruded from the spinneret.

In a typical process, pellets or granules of the solid polymer are fed into an extruder. The pellets are compressed, heated and melted by an extrusion screw, then fed to a spinning pump and into the spinneret. A direct spinning process avoids the stage of solid polymer pellets. The polymer melt is produced from the raw materials, and then from the polymer finisher directly pumped to the spinning mill. Direct spinning is mainly applied during production of polyester fibers and filaments and is dedicated to high production capacity (>100 tons/day). Gel spinning, also known as dry-wet spinning, is used to obtain high strength or other special properties in the fibers. The polymer is in a "gel" state, only partially liquid, which keeps the polymer chains somewhat bound together. These bonds produce strong inter-chain forces in the fiber, which increase its tensile strength. The polymer chains within the fibers also have a large degree of orientation, which increases strength. The fibers are first air dried, then cooled further in a liquid bath. Some high strength polyethylene and aramid fibers are produced via this process.

An alternative for making fine fibers of the disclosure is a melt-blowing process. Melt-blowing (MB) is a process for producing fibrous webs or articles directly from polymers or resins using high-velocity air or another appropriate force to attenuate the filaments. This process is unique because it is used almost exclusively to produce microfibers rather than fibers the size of normal textile fibers. MB microfibers generally have diameters in the range of 2 to 4 µm (micrometers or microns or µ), although they may be as small as 0.1 µm and as large as 10 to 15 µm. Differences between MB nonwoven fabrics and other nonwoven fabrics, such as degree of softness, cover or opacity, and porosity can generally be traced to differences in filament size. As soon as the molten polymer is extruded from the die holes, high velocity hot air streams (exiting from the top and bottom sides of the die nosepiece) attenuate the polymer streams to form microfibers. As the hot air stream containing the microfibers progresses toward the collector screen, it entrains a large amount of surrounding air (also called secondary air) that cools and solidifies the fibers. The solidified fibers subsequently get laid randomly onto the collecting screen, forming a self-bonded nonwoven web. The fibers are generally laid randomly (and also highly entangled) because of the turbulence in the air stream, but there is a small bias in the machine direction due to some directionality imparted by the moving collector. The collector speed and the collector distance from the die nosepiece can be varied to produce a variety of melt-blown webs. Usually, a vacuum is applied to the inside of the collector screen to withdraw the hot air and enhance the fiber laying process.

Any of the above-listed processes for making the fine fiber of the disclosure can be used to make the permeable course fibrous material for the filtration substrate. Spunbond techniques can also be used for making the permeable course fibrous material for the filtration substrate. Spunbond fabrics are produced by depositing extruded, spun filaments onto a collecting belt in a uniform random manner followed by bonding the fibers. The fibers are separated during the web laying process by air jets or electrostatic charges. The collecting surface is usually perforated to prevent the air stream from deflecting and carrying the fibers in an uncontrolled manner. Bonding imparts strength and integrity to the web by applying heated rolls or hot needles to partially melt the polymer and fuse the fibers together. Since molecular orientation increases the melting point, fibers that are not highly drawn can be used as thermal binding fibers. Polyethylene or random ethylene-propylene copolymers are used as low melting bonding sites. Spunbond products are employed in carpet backing, geotextiles, and disposable medical/hygiene products. Since the fabric production is combined with fiber production, the process is generally more economical than when using staple fiber to make nonwoven fabrics. The spinning process is similar to the production of continuous filament yarns and utilizes similar extruder conditions for a given polymer. Fibers are formed as the molten polymer exits the spinnerets and is quenched by cool air. The objective of the process is to produce a wide web and, therefore, many spinnerets are placed side by side to generate sufficient fibers across the total width. The grouping of spinnerets is often called a block or bank. In commercial production two or more blocks are used in tandem in order to increase the coverage of fibers.

In a spunbond process, before deposition on a moving belt or screen, the output of a spinneret usually consists of a hundred or more individual filaments which must be attenuated to orient molecular chains within the fibers to increase fiber strength and decrease extensibility. This is accomplished by rapidly stretching the plastic fibers immediately after exiting the spinneret. In practice the fibers are accelerated either mechanically or pneumatically. In most processes the fibers are pneumatically accelerated in multiple filament bundles; however, other arrangements have been described where a linearly aligned row or rows of individual filaments is pneumatically accelerated.

In a traditional textile spunbond process some orientation of fibers is achieved by winding the filaments at a rate of approximately 3,200 m/min to produce partially oriented yarns (POY). The POYs can be mechanically drawn in a separate step for enhancing strength. In spunbond production filament bundles are partially oriented by pneumatic acceleration speeds of 6,000 m/min or higher. Such high speeds result in partial orientation and high rates of web formation, particularly for lightweight structures (17 $g/m^2$).
The formation of wide webs at high speeds is a highly productive operation.

For many applications, partial orientation of the course fibers of the filter substrate sufficiently increases strength and decreases extensibility to give a functional fabric (examples: diaper cover stock). However, some applications, such as primary carpet backing, require filaments with very high tensile strength and low degree of extension. For such application, the filaments are drawn over heated rolls with a typical draw ratio of 3.5:1. The filaments are then pneumatically accelerated onto a moving belt or screen. This process is slower, but gives stronger webs.

The spunbond web is formed by the pneumatic deposition of the filament bundles onto the moving belt. A pneumatic gun uses high-pressure air to move the filaments through a constricted area of lower pressure, but higher velocity as in a venturi tube. In order for the web to achieve maximum uniformity and cover, individual filaments can be separated before reaching the belt. This is accomplished by inducing an electrostatic charge onto the bundle while under tension and before deposition. The charge may be induced triboelectrically or by applying a high voltage charge. The former is a result of rubbing the filaments against a grounded, conductive surface. The electrostatic charge on the filaments can be at least 30,000 000 electrostatic units per square meter ($esu/m^2$).

Fibers (preferably, fine fibers) of the disclosure can be made preferably using the electrostatic spinning process. A suitable electrospinning apparatus for forming the fine fibers includes a reservoir in which the fine fiber forming solution is contained, and an emitting device, which generally consists of a rotating portion including a plurality of offset holes. As it rotates in the electrostatic field, a droplet of the solution on the emitting device is accelerated by the electrostatic field toward the collecting media. Facing the emitter, but spaced apart therefrom, is a grid upon which the collecting media (i.e., a substrate or combined substrate) is positioned. Air can be drawn through the grid. A high voltage electrostatic potential is maintained between emitter and grid by means of a suitable electrostatic voltage source. The substrate is positioned in between the emitter and grid to collect the fiber.

Specifically, the electrostatic potential between grid and the emitter imparts a charge to the material which cause liquid to be emitted therefrom as thin fibers which are drawn toward grid where they arrive and are collected on substrate. In the case of the polymer in solution, a portion of the solvent is evaporated off the fibers during their flight to the substrate. The fine fibers bond to the substrate fibers as the solvent continues to evaporate and the fiber cools. Electrostatic field strength is selected to ensure that as the polymer material is accelerated from the emitter to the collecting media, the acceleration is sufficient to render the polymer material into a very thin microfiber or nanofiber structure. Increasing or slowing the advance rate of the collecting media can deposit more or less emitted fibers on the forming media, thereby allowing control of the thickness of each layer deposited thereon. Electrospinning processes usually use polymer solutions with 5-20% solids (on polymer) concentration. Solvents that are safe and easy to use are desired in industrial applications. On the other hand, fibers formed with such solvents often need to survive and perform in a wide variety of environments.

Filter media with high removal efficiency can be manufactured utilizing the polymers and fibers from this disclosure. Typical properties of the filter media are shown in Table 1. In Table 1, LEFS efficiency (Low Efficiency Flat Sheet) refers to the removal efficiency for 0.78 micron latex particles at a face velocity of 20 feet/minute (ft/min) when tested according to ASTM-1215-89.

TABLE 1

| Typical Fiber Parameters | | | | |
|---|---|---|---|---|
| Fiber (size) diameter | 0.01-2 | 0.05-0.8 | 0.1-0.5 | (μ) |
| Layer thickness | 0.1-8 | 0.4-5 | 0.8-4 | (μ) |
| Efficiency | At least 75% | 75-90% | 80-85% | (LEFS) |

The fibers (preferably, fine fibers) of the present disclosure in the form of a layer disposed on a filtration substrate can then be manufactured into filter elements, including flat-panel filters, cartridge filters, or other filtration components. Examples of such filter elements am described in U.S. Pat. Nos. 6,746,517; 6,673,136; 6,800,117; 6,875,256; 6,716,274; and 7,316,723.

Exemplary Embodiments

1. A fiber comprising a nonreactive polymer and a self-crosslinked resinous aldehyde composition.

2. The fiber of embodiment 1 wherein the nonreactive polymer and self-crosslinked resinous aldehyde composition forms a uniform mixture in a semi-interpenetrating network morphology.

3. The fiber of embodiment 1 wherein the fiber comprises a core phase and a coating phase; wherein the core phase comprises a nonreactive polymer and the coating phase comprises a self-crosslinked resinous aldehyde composition.

4. The fiber of embodiment 3 comprising two phases, wherein the core phase comprises a mixture of the polymer and the resinous aldehyde composition.

5. The fiber of embodiment 3 comprising three phases, wherein the core phase comprises the polymer, the coating phase comprises the resinous aldehyde composition, and a transition phase comprises a mixture of the polymer and the resinous aldehyde composition.

6. The fiber of any one of embodiments 1 through 4 which is prepared from a resinous aldehyde composition comprising reactive alkoxy groups and a nonreactive polymer.

7. The fiber of any one of embodiments 1 through 6 wherein the resinous aldehyde composition is present in an amount of greater than 20 parts by weight per 100 parts by weight of the polymer.

8. The fiber of any one of embodiments 1 through 7 which is a fine fiber.

9. The fiber of any one of embodiments 1 through 8 wherein the resinous aldehyde composition comprises a resinous formaldehyde composition.

10. The fiber of embodiment 9 wherein the resinous formaldehyde composition comprises a resinous melamine-formaldehyde composition.

11. The fiber of any one of embodiments 1 through 8 wherein the resinous aldehyde composition comprises a melamine-aldehyde composition; and wherein the aldehyde comprises formaldehyde, acetaldehyde, butyraldehyde, isobutyraldehyde, or mixture thereof.

12. The fiber of any one of embodiments 1 through 8 wherein the resinous aldehyde composition comprises a condensation product of urea and an aldehyde, a condensation product of phenol and an aldehyde, a condensation product of melamine and an aldehyde, or a mixture thereof.

13. The fiber of any one of embodiments 1 through 8 wherein the resinous aldehyde composition comprises a condensation product of benzoguanamine and an aldehyde, a condensation product of glycoluril and an aldehyde, or a mixture thereof.

14. A fine fiber comprising a core phase and a coating phase; wherein the core phase comprises nonreactive polymer and the coating phase comprises a self-crosslinked resinous melamine-aldehyde composition; wherein the fine fiber is prepared from a resinous melamine-aldehyde composition in an amount of greater than 20 parts by weight per 100 parts by weight of the nonreactive polymer.

15. A filter media comprising a filtration substrate and a layer comprising a plurality of fine fibers of any one of embodiments 1 through 14 disposed on the substrate.

16. The filter media of embodiment 15 wherein the fine fiber layer has a thickness of 0.05μ to 30μ.

17. The filter media of embodiment 15 or embodiment 16 wherein the filtration substrate is a non-woven substrate.

18. The filter media of any one of embodiments 15 through 17 wherein the fine fiber layer is an electrospun layer and the filtration substrate comprises a cellulosic or synthetic nonwoven.

19. The fine fiber media of any one of embodiments 15 through 17 wherein the filtration substrate comprises a polyester nonwoven, a polyolefin nonwoven, or a blended nonwoven thereof.

20. The fine fiber media of embodiment 19 wherein the filtration substrate comprises polypropylene nonwoven.

21. The fine fiber media of embodiment 15 wherein the filtration substrate comprises a spunbonded or melt-blown support.

22. A filter element comprising a fine fiber media of any one of embodiments 15 through 21.

EXAMPLES

Objects and advantages of this disclosure are further illustrated by the following examples, but the particular materials and amounts thereof recited in these examples, as well as other conditions and details, should not be construed to unduly limit this disclosure.

Test Procedures

ESCA

Electron spectroscopy or chemical analysis (ESCA, also known as x-ray photoelectron spectroscopy or XPS) is a surface analysis technique used for obtaining chemical information about the surfaces of solid materials. The materials characterization method utilizes an x-ray beam to excite a solid sample resulting in the emission of photoelectrons. An energy analysis of them photoelectrons provides both elemental and chemical bonding information about a sample surface. The relatively low kinetic energy of the photoelectrons gives ESCA a sampling depth of approximately 3 Å. ESCA can detect all elements from lithium to uranium with detection limits of approximately 0.1 atomic percent. The principal advantage of ESCA is its ability to look at a broad range of materials (polymers, glasses, fibers, metals, semiconductors, paper, etc.) and to identify surface constituents as well as their chemical state. This test can be used as an indicator of migration of the aldehyde compound to the surface of the fiber.

Ethanol Soak Test

A sample of fine fibers in the form of a layer disposed an a substrate is submerged in ethanol (190 proof) under ambient conditions. After 1 minute, the sample is removed, dried, and evaluated for the amount of fine fiber layer efficiency retained as determined according to the procedure described in U.S. Pat. No. 6,743,273 ("Fine fiber layer efficiency retained"). The amount of fine fiber retained is reported as a percentage of the initial amount of fine fibers and referred to as "fine fiber layer efficiency retained." This gives a good indication of whether the degree of crosslinking achieved was sufficient to protect the bulk material from attack/dissolution to ethanol.

Hot Water Soak Test

A sample of fine fibers in the form of a layer disposed on a substrate is submerged in water previously heated to a temperature of 140° F. After 5 minutes, the sample is removed, dried, and evaluated for the amount of fine fiber layer efficiency retained as determined according to the procedure described in U.S. Pat. No. 6,743,273 ("Fine fiber layer efficiency retained"). The amount of fine fiber retained is reported as a percentage of the initial amount of fine fibers and referred to as "fine fiber layer efficiency retained." This gives a good indication of whether the degree of crosslinking achieved was sufficient to protect the bulk material from attack/dissolution to hot water.

Preparation of Fine Fibers

Reference Examples

Reference Example 1 (Example 5 of Chung at al., U.S. Pat. No. 6,743,273) utilizes the formation of a surface coating layer by incorporating oligomers of p-tert-butyl phenol, an additive that protects fine fibers from wet environments.

An alternate method to improve environmental resistance involves blending a self-crosslinkable polymer and a non-self-crosslinkable polymer, resulting in the formation of a structure that is analogous to an IPN (interpenetrating network) or semi-IPN (semi-interpenetrating network) wherein the non-crosslinkable polymer does not redissolve after electrospinning and heat treatment. Reference Example 2 (Example 6 of Chung et al., U.S. Pat. No. 6,743,273) describes how such a structure can be achieved.

Finally, Reference Example 3 (Example 6B of Chung at al., U.S. Pat. No. 6,743,273) combines three important components: a non-selfcrosslinkable fiber-forming polymer, a self-crosslinkable fiber-forming polymer, and a noncrosslinkable surface-forming additive.

Reference Example 4

Nylon copolymer resin (SVP 651 obtained from Shakespeare Co., Columbia, S.C., a terpolymer having a number average molecular weight of 21,500-24,800 comprising 45% nylon-6, 20% nylon-6,6 and 25% nylon-6,10) solutions were prepared by dissolving the polymer in alcohol (ethanol, 190 proof) and heating to 60° C. to produce a 9% solids solution. After cooling, to the solution was added a melamine-formaldehyde resin (i.e., crosslinking agent) (CYMEL 1133 obtained from Cytec Industries of West Paterson, N.J.). The weight ratio of melamine-formaldehyde resin to nylon was 40:100 parts by weight. Additionally, to the solution was added para-toluene sulfonic acid (7%, based on polymer solids). The solution was agitated until uniform and was then electrospun to form a layer of fine fiber on a filtration substrate. For this example a voltage of 50 kV was used to form the fine fiber layer on a substrate material moving at a line speed of 5 ft/min at a distance 4 inches from the emitter. The substrate material was a wetlaid cellulose media from Hollingsworth and Vose (Grade FA 448) with an average basis weight of 68.6 lbs/3000 ft$^2$, average thickness of 0.011 inch (in), and average Frazier permeability of 16 ft/min. The fine fibers disposed on the substrate were thermally treated at 140° C. for 10 minutes.

Example 1

The materials tested for filtration efficiency as shown in FIG. 2 were manufactured as follows. Poly(4-vinyl pyridine) resin ("P4VP") solutions were prepared by dissolving the polymer (8%) in 190 proof ethanol/water mixture (90:10 weight ratio). The homopolymer (P4VP) employed has a viscosity average molecular weight of about 200,000 (Scientific Polymer). To the solution was added melamine-formaldehyde crosslinking agent (RESIMENE HM2608 obtained from INEOS Melamines Inc., "ME"), an amount of about 20:100 parts by weight of resin:polymer content. Additionally to the solution was added para-toluene sulfonic acid (7 wt-%, based on polymer solids). The solution was agitated until uniform and was then electrospun to form a layer of fine fiber on a filtration substrate. For this example a voltage of 50 kV was used to form the fine fiber layer on a substrate material moving at a line speed of 5 ft/min at a distance 4 inches from the emitter. The substrate material was a wetlaid cellulose media from Hollingsworth and Vose (Grade FA 448) with an average basis weight of 68.6 lbs/3000 ft$^2$, average thickness of 0.011 inch (in), and average Frazier permeability of 16 ft/min. The fine fibers disposed on the substrate were thermally treated at 140° C. for 10 minutes. The composite media layer formed had an initial LEFS efficiency of 90% and an initial pressure drop of 0.81 in of water. In this context, "initial" means prior to any ethanol or water soak testing.

Examples 2-5

Example 1 was repeated except using the melamine-formaldehyde agent and P4VP In weight ratios of ME:P4VP of 40:100 (Example 2), 60:100 (Example 3), 80:100 (Example 4) and 0:100 (Example 5). For Examples 2-4, poly (4-vinyl pyridine) resin (P4VP) solutions were prepared by dissolving the polymer (8%) in 190 proof ethanol/water mixture (90:10 wt ratio). For Example 5, poly(4-vinyl pyridine) resin a 10% (P4VP) solution was prepared. Example 2 had an initial LEFS efficiency of 92% and an initial pressure drop of 0.82 inch of water. Example 3 had an initial LEFS efficiency of 90.6% and an initial pressure drop of 0.84 inch of water. Example 4 had an initial LEFS efficiency of 86.4% and an initial pressure drop of 0.85 in of water. Finally, for Example 5, which is the control (no self-crosslinking resin added), an initial LEFS efficiency of 77% was obtained with a pressure drop of 0.83 in of water. In this context, "initial" means prior to any ethanol or water soak testing. The results are tabulated in Table 2 below.

TABLE 2

| Fine Fiber Polymer | LEFS Efficiency (composite) | Pressure Drop (inch H$_2$O) |
| --- | --- | --- |
| Ex 1 | 90 (initial) | 0.81 (initial) |
| Ex 2 | 92 (initial) | 0.82 (initial) |
| Ex 3 | 90.6 (initial) | 0.84 (initial) |

TABLE 2-continued

| Fine Fiber Polymer | LEFS Efficiency (composite) | Pressure Drop (inch H$_2$O) |
|---|---|---|
| Ex 4 | 86.4 (initial) | 0.85 (initial) |
| Ex 5 | 78 (initial) | 0.83 (initial) |
| Ref Ex 2 | 78.1 (initial) | 0.84 (initial) |
| Ref Ex 4 | 87.8 (initial) | 0.81 (initial) |

Results: Bulk Properties
Fiber Morphology

The fine fiber samples produced in Examples 1-5 had an average fiber diameter of no greater than 10 microns. Typically, they possessed average fiber diameters ranging from 200 nm to 400 nm, as measured by SEM. Certain of the samples were evaluated for fiber morphology, particle capture efficiency (LEFS—particle capture efficiency at 0.8 μm latex particles, bench operating at 20 ft/min per ASTM Standard F1215-89), humidity resistance, and crosslinking efficiency.

FIG. 1 compares the SEM images of the fibers obtained from Reference Example 2, Reference Example 4, and a fiber of Example 3; both fiber layers were formed on the same substrate material. Clearly both fiber formation and the resulting fiber diameters are very similar.

Effect of Catalyst Level

The recommended catalyst level of melamine-formaldehyde resin is usually less than 2% of solids (for typical three-dimensional products such as films). In the case of one-dimensional fibers, a higher level of catalyst is desired to obtain sufficiently fast crosslinking speed. It is believed that the active catalyst species has to travel along the fiber axis, instead of along usual three dimensional directions. Thus, preferred catalyst concentrations are at least 4 wt-%, based on polymer solids for preferred crosslinking rates.

Environmental Resistance

From an environmental-resistance perspective, the effects of ethanol and water soak were tested on cellulose filter media (flat sheet) of the Reference Example 2 fiber, Reference Example 4 fiber versus the fine fibers of Example 3.

FIG. 2 shows that following ethanol and hot water soak the fine fiber layer efficiency retention for the pure homopolymer fibers is zero (designated as Example 5 in FIG. 2). As the amount of the self-crosslinking melamine-formaldehyde resin (RESIMENE HM2608) is increased, fine fiber resistance to both ethanol and water increases dramatically. SEM images shown in FIG. 3 confirm this conclusion.

Surface Properties
Surface Analysis by ESCA

In order to better understand the fine fiber morphology ESCA analysis on fine fibers made as in Examples 1-5 but collected on a stationary substrate for 5 minutes (referred to in FIG. 3 as Examples 1'-5', evaluated at Evans Analytical Group, Chaska, Minn.). The C1s profile is separated into two components: 1) contribution from the self-crosslinking melamine-formaldehyde resin (RESIMENE HM2608, "MA") and 2) from P4VP. Separating the C1s profile ones sees an increase in the contribution from the P4VP component with sputtering time until it becomes constant. Correspondingly, one observes a decrease in the C1s contribution from the coating component. By looking at the contributions from C—C, C—N—C, C—O etc., the approximate surface carbon chemistries was determined and is tabulated below. Column 3 ("C_MA") and 4 ("C_P4VP") defines the contributions from the aldehyde resin and the nonreactive polymer, respectively.

TABLE 3

| Approximate Surface[#] Carbon Chemistries (in % of Total C) | | | |
|---|---|---|---|
| Sample | Description | C_MA | C_P4VP |
| Ex 1' | P4VP:MA = 1:0.2 | 12 | 88 |
| Ex 2' | P4VP:MA = 1:0.4 | 24 | 76 |
| Ex 3' | P4VP:MA = 1:0.6 | 35 | 65 |
| Ex 4' | P4VP:MA = 1:0.8 | 67 | 33 |

[#]Obtained from the first (surface) cycle of depth profiles.

The results are indicative of a fine fiber that has a core sheath but blend type morphology. In FIG. 4 as the sputtering time increases fine fiber layers are increasingly being lost. Based on the C1-s curves and table above, it is clear that for samples of Examples 1' to 3', there are 2 layers; an internal polymer layer with little or no melamine-formaldehyde and a sheath layer with both polymer and melamine-formaldehyde. However the majority component in the sheath layer is still the polymer (see Table 3 above). For sample of Example 4', there are three layers; a melamine rich (major component) outer sheath, a polymer rich transition (blended) phase and an axial polymer layer with little or no melamine-formaldehyde. This conclusion is supported by following %-atomic O. The O1s contribution plotted in FIG. 4 comes entirely from the self-crosslinking resin (P4VP has no oxygen).

Based on the results shown in FIG. 4, the morphology for P4VP/HM2608 fine fiber can be described pictorially with two possibilities as shown in FIG. 5(a) (for Examples 1' to 3') and FIG. 5(b) (for Example 4').

The complete disclosures of the patents, patent documents, and publications cited herein are incorporated by reference in their entirety as if each were individually incorporated. While the disclosure is susceptible to various modifications and alternative forms, specifics thereof have been shown by way of example and drawings, and will be described in detail. It should be understood, however, that the disclosure is not limited to the particular embodiments described. On the contrary, the intention is to cover modifications, equivalents, and alternatives falling within the spirit and scope of the disclosure.

The invention claimed is:

1. A fiber comprising:
   a core phase comprising a nonreactive polymer;
   a coating phase comprising a self-crosslinked resinous aldehyde composition, wherein the self-crosslinked resinous aldehyde composition forms an outermost layer of the fiber; and
   a transition phase between the core phase and the coating phase, comprising a mixture of the nonreactive polymer and the resinous aldehyde composition,
   wherein the fiber has an average diameter of no greater than 5 microns.

2. The fiber of claim 1 which is prepared from a resinous aldehyde composition comprising reactive alkoxy groups and a nonreactive polymer.

3. The fiber of claim 1 wherein the resinous aldehyde composition is present in an amount of greater than 20 parts by weight per 100 parts by weight of the nonreactive polymer.

4. The fiber of claim 1 wherein the resinous aldehyde composition comprises a resinous formaldehyde composition.

5. The fiber of claim 4 wherein the resinous formaldehyde composition comprises a resinous melamine-formaldehyde composition.

6. The fiber of claim 1 wherein the resinous aldehyde composition comprises a melamine-aldehyde composition; and wherein the aldehyde comprises formaldehyde, acetaldehyde, butyraldehyde, isobutyraldehyde, or mixtures thereof.

7. The fiber of claim 1 wherein the resinous aldehyde composition comprises
- a condensation product of urea and an aldehyde, a condensation product of phenol and an aldehyde, a condensation product of melamine and an aldehyde, or a mixture thereof; or
- wherein the resinous aldehyde composition comprises a condensation product of benzoguanamine and an aldehyde, a condensation product of glycoluril and an aldehyde, or a mixture thereof.

8. A filter media comprising a filtration substrate and a fiber layer, the fiber layer comprising a plurality of the fibers of claim 1 disposed on the substrate.

9. The filter media of claim 8 wherein the fiber layer has a thickness of $0.05\mu$ to $30\mu$.

10. The filter media of claim 8 wherein the filtration substrate comprises a non-woven substrate, a spunbonded support, or a melt-blown support.

11. The filter media of claim 8 wherein the fiber layer is an electrospun layer and the filtration substrate comprises a cellulosic or synthetic nonwoven.

12. The filter media of claim 8 wherein the filtration substrate comprises a polypropylene nonwoven, a polyester nonwoven, a polyolefin nonwoven, or a blended polyester and polyolefin nonwoven.

13. A filter element comprising the filter media of claim 8.

14. The fiber of claim 1 wherein the nonreactive polymer comprises an addition polymer.

15. The fiber of claim 1 wherein the nonreactive polymer comprises at least one of a polyacetal, a polyester, a polyalkylene sulfide, a polyarylene oxide, a polysulfone, a modified polysulfone polymer, and a poly(vinylpyridine), and mixtures and copolymers thereof.

16. The fiber of claim 1 wherein the nonreactive polymer comprises at least one of poly(vinyl chloride), poly(vinylidene chloride), poly(vinylidene fluoride), an acrylic resin, polymethylmethacrylate, and polystyrene, and mixtures and copolymers thereof.

17. The fiber of claim 1 wherein the nonreactive polymer comprises
- polyvinyl acetate,
- a block copolymer,
- styrene-b-butadiene,
- styrene-b-hydrogenated butadiene (ethylene propylene), or
- polyester-b-ethylene oxide.

18. The fiber of claim 1, wherein the fiber is made by:
- preparing a solution or dispersion comprising the nonreactive polymer and the resinous aldehyde; and
- electrospinning the solution or dispersion.

* * * * *